US012435856B2

(12) United States Patent
Park et al.

(10) Patent No.: US 12,435,856 B2
(45) Date of Patent: Oct. 7, 2025

(54) VEHICLE LAMP HAVING A LENS WITH A FUNCTIONAL LAYER AND A COLOR LAYER

(71) Applicant: SL Corporation, Daegu (KR)

(72) Inventors: Jong Ryoul Park, Auburn Hills, MI (US); Michael Luketich, Auburn Hills, MI (US); Arun Kumar Pesala, Auburn Hills, MI (US)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/794,225

(22) Filed: Aug. 5, 2024

(65) Prior Publication Data

US 2025/0075873 A1 Mar. 6, 2025

Related U.S. Application Data

(60) Provisional application No. 63/580,195, filed on Sep. 1, 2023.

(51) Int. Cl.

| | |
|---|---|
| ***F21S 43/20*** | (2018.01) |
| ***F21S 43/00*** | (2018.01) |
| ***F21S 43/33*** | (2018.01) |
| ***F21S 43/50*** | (2018.01) |
| *F21W 104/00* | (2018.01) |
| *F21Y 113/00* | (2016.01) |

(52) U.S. Cl.

CPC .......... *F21S 43/255* (2018.01); *F21S 43/331* (2024.05); *F21S 43/50* (2018.01); *F21S 43/601* (2024.05); *F21W 2104/00* (2018.01); *F21Y 2113/30* (2023.05)

(58) Field of Classification Search

CPC ............ F21Y 2113/30; F21W 2104/00; F21S 43/2812; F21S 43/601; F21S 43/2817; F21S 41/275

See application file for complete search history.

(56) References Cited

U.S. PATENT DOCUMENTS 11,448,380 B2 * 9/2022 Park ...................... G02F 1/1533
11,927,319 B1 * 3/2024 Robertson, Jr. ......... F21S 41/40

FOREIGN PATENT DOCUMENTS

EP 3982037 A1 * 4/2022 ............ F21S 41/143

* cited by examiner

*Primary Examiner* — Robert J May

(74) *Attorney, Agent, or Firm* — United One Law Group LLC; Kongsik Kim; Jhongwoo Peck

(57) ABSTRACT

A vehicle lamp, which reflects light of a predetermined color using ambient light and emits light of a predetermined pattern using internal light, includes: a light source that emits light; a lens disposed in a light emission path of the light source; and a main film attached to the lens. The main film includes: a color layer that reflects ambient light in a predetermined color; and a functional layer that selectively transmits the light emitted from the light source.

20 Claims, 15 Drawing Sheets

VEHICLE LAMP HAVING A LENS WITH A FUNCTIONAL LAYER AND A COLOR LAYER

CROSS-REFERENCE TO RELATED APPLICATION

This application claims priority from U.S. Provisional Application No. 63/580,195 filed Sep. 1, 2023, which is incorporated herein by reference in its entirety.

BACKGROUND

1. Technical Field

The present disclosure relates to a vehicle lamp, and more particularly, to a vehicle lamp that reflects light of a predetermined color using ambient light and emits light of a predetermined pattern using internal light.

2. Description of the Related Art

In general, vehicles are equipped with lamp modules that provide an illumination function for more easily identifying objects located around the vehicles during low-light conditions (e.g., night driving) and a signaling function for informing other vehicles or road users of the driving status of the vehicles. For example, headlights and fog lights serve the purpose of illumination, and turn signals, tail lights, brake lights, and side markers serve the purpose of signaling.

Recently, lamp modules have evolved beyond simple illumination or signaling functions to improve aesthetics by emitting light of particular shapes to the outside and to enhance the recognition of brand and product images.

Meanwhile, since modifying the shape of light emitted to the outside of a vehicle is a mature technology, it is not easy to achieve differentiation from other products through this alone.

Therefore, there is a need for a vehicle lamp that can provide a more distinct look from other products.

SUMMARY

Aspects of the present disclosure provide a vehicle lamp that reflects light of a predetermined color using ambient light and emits light of a predetermined pattern using internal light.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a light source that emits light; a lens disposed in a light emission path of the light source; and a main film attached to the lens. The main film may include a color layer that reflects ambient light in a predetermined color; and a functional layer that selectively transmits the light emitted from the light source.

The lens may be disposed between the light source and the main film.

The vehicle lamp may further include a color conversion layer that converts the light emitted from the light source into a predetermined color. The functional layer may be disposed between the color layer and the color conversion layer.

The main film may further include a pattern layer that transmits the light from the light source in a predetermined pattern, and the pattern layer may be disposed between the light source and the functional layer. The pattern layer may include: a light-blocking portion that blocks light; and a light-transmitting portion that transmits light in a predetermined pattern.

Color of the light that has passed through the color conversion layer and the color layer may be substantially white.

The functional layer may reflect some of the ambient light and transmit some of the light emitted from the light source.

The functional layer may selectively transmit the light from the light source using at least one of a suspended particle device (SPD) method, a polymer dispersed liquid crystal (PDLC) method, an electrophoresis method, or an electrochromic (EC) method.

The functional layer may selectively transmit the light from the light source therethrough using a piezoelectric method. Color of the light emitted from the light source may be determined to allow substantially white light to be observed after the light from the light source passes through the color layer. The main film may further include a correction layer that corrects the color of the light emitted from the light source.

The functional layer may include: an ultraviolet (UV) blocking layer that blocks UV light; and a UV activating layer in which a transmittance for visible light through the UV activating layer is changed in response to ultraviolet light being incident thereto. The light source may include: a first light source that emits visible light; and a second light source that emits ultraviolet light. The UV activating layer may transmit the visible light from the first light source in response to the UV light from the second light source being incident, and block the visible light from the first light source in response to the UV light from the second light source not being incident. The UV activating layer may be disposed between the UV blocking layer and the light source.

The vehicle lamp may further include: an auxiliary film attached to the lens on a side where the main film is not attached, and the auxiliary film may include a guide layer that guides the light from the light source; and a reflective layer that reflects the light guided along the guide layer toward a direction of the main film. The vehicle lamp may further include: a color filter disposed between the light source and the guide layer for converting the light emitted from the light source into a predetermined color. Color of the light that has passed through the color filter and the color layer may be substantially white.

Since the vehicle lamp according to the present disclosure reflects light of a predetermined color using ambient light, it allows for observation in the same color as the body of a vehicle. Additionally, since the vehicle lamp according to the present disclosure emits light of a predetermined pattern using internal light, it provides the advantage of offering higher quality aesthetics.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
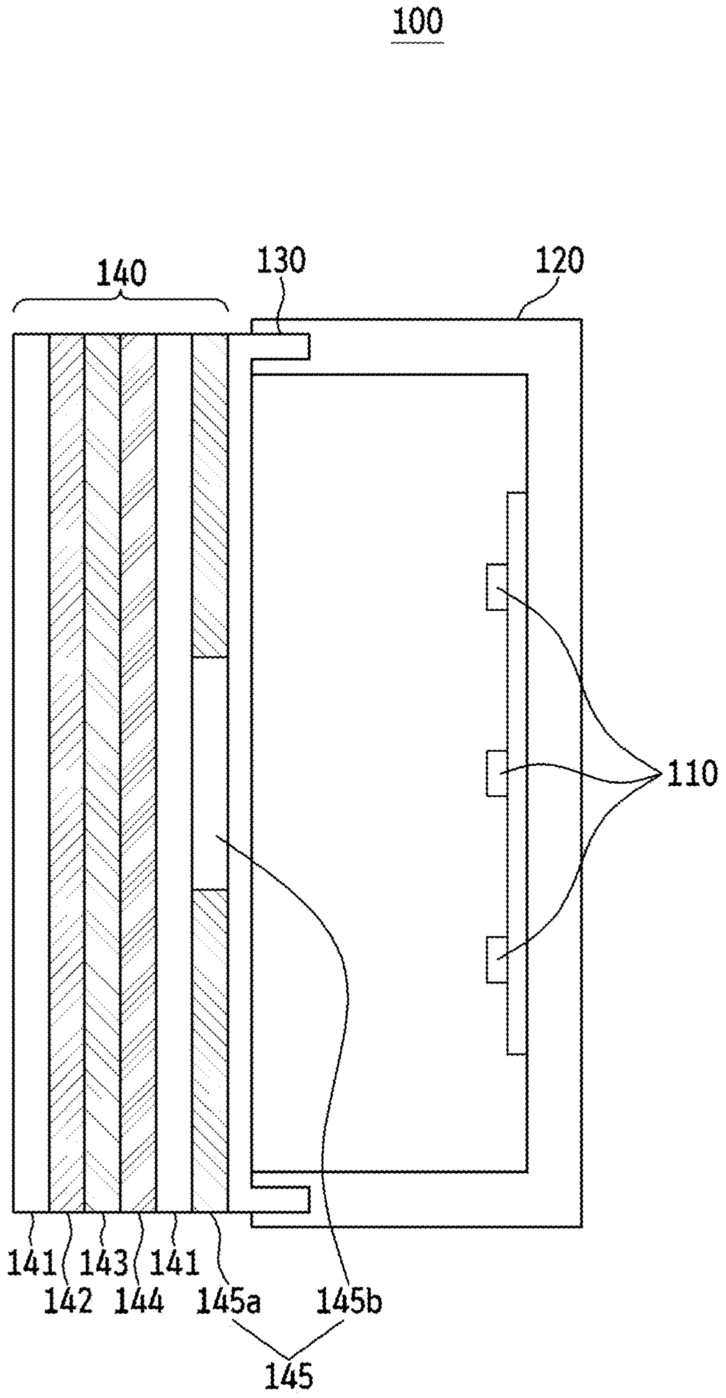
FIG. 1 illustrates a vehicle lamp according to an embodiment of the present disclosure.

Exemplary embodiments of the present disclosure will hereinafter be described in detail with reference to the accompanying drawings. The advantages and features of the present disclosure, and methods for achieving them, will become apparent by referring to the embodiments described below in detail in conjunction with the accompanying drawings. However, the present disclosure is not limited to the embodiments disclosed below and can be implemented in various other forms. These embodiments are provided to make the present disclosure thorough and to fully convey the scope of the disclosure to those skilled in the art to which the disclosure pertains. The present disclosure is defined only by the claims. Throughout the specification, like reference numerals refer to like elements.

Unless otherwise defined, all terms (including technical and scientific terms) used herein can be understood to have the same meaning as commonly understood by one of ordinary skill in the art to which this disclosure belongs. Terms defined in commonly used dictionaries should be interpreted as having meanings that are consistent with those in the context of the relevant art, and are not to be interpreted in an overly idealized or excessive sense unless expressly and specifically defined.

FIG. 1 illustrates a vehicle lamp according to a first embodiment of the present disclosure. Referring to FIG. 1, a vehicle lamp 100 may include a light source 110, a housing 120, a lens 130, and a main film 140.

The light source 110 may emit light. The light source 110, which is a light-emitting module that generates light, may be one of a light-emitting diode (LED), laser, or bulb-type light source. The light source 110 may emit light with a predetermined angular range.

The housing 120 may accommodate the light source 110. The housing 120 may be fixed to the body of a vehicle. The light source 110 may emit light from a fixed position on the vehicle. The inner surface of the housing 120 may be formed of a reflective material. In this case, the efficiency of light output from the housing 120 to the outside can be improved.

An opening may be formed on one side of the housing 120. The lens 130 may be disposed in the opening of the housing 120. When the housing 120 and the lens 130 are combined, a space for accommodating the light source 110 may be formed.

The lens 130 may be disposed in the light emission path of the light source 110. The light source 110 may emit light toward the lens 130. The lens 130 may alter and transmit the light from the light source 110. For example, the lens 130 may diffuse or concentrate the light from the light source 110 and then transmit it. Alternatively, the lens 130 may transmit the light from the light source 110 as is. The lens 130 may have a relatively high light transmittance. Therefore, the light from the light source 110 may pass through the lens 130 with high efficiency.

The main film 140 may be attached to the lens 130. Specifically, the main film 140 may be attached to the outer surface of the lens 130. In this case, the lens 130 may be disposed between the light source 110 and the main film 140. The light from the light source 110 may pass through the lens 130 and then through the main film 140.

The main film 140 may include protective layers 141, a color layer 142, a functional layer 143, a color conversion layer 144, and a pattern layer 145.

The protective layers 141 may protect the color layer 142, the functional layer 143, and the color conversion layer 144. To this end, the protective layers 141 may have a relatively high rigidity. Additionally, the protective layers 141 may have a relatively high light transmittance. The color layer 142, the functional layer 143, and the color conversion layer 144 may be interposed between two protective layers 141. The protective layers 141 may prevent damage to the color layer 142, the functional layer 143, and the color conversion layer 144.

FIG. 1 illustrates the pattern layer 145 as being disposed outside the protective layers 141, but alternatively, the pattern layer 145, like the color layer 142, the functional layer 143, and the color conversion layer 144, may also be disposed between the two protective layers 141. In this case, the pattern layer 145 may also be protected by the protective layers 141.

The color layer 142 may reflect ambient light 1000 in a predetermined color. For example, the color layer 142 may be filled with paint of a particular color. When the ambient light 1000 is reflected by the color layer 142, the reflected light may have the particular color. Here, the ambient light 1000 may include visible light components irradiated toward the vehicle, such as sunlight or streetlight.

The functional layer 143 may selectively transmit the light from the light source 110 therethrough. For example, the functional layer 143 may transmit some or all of the light from the light source 110 therethrough. Additionally, the functional layer 143 may block or limit the transmission of ambient light 1000 to the color conversion layer 144. The functional layer 143 may have a semi-transmissive property, reflecting some of the ambient light 1000 and transmitting some of the light from the light source 110 therethrough.

The color conversion layer 144 may convert the light from the light source 110 into a predetermined color. As the light from the light source 110 passes through the color conversion layer 144, the color of the light may be changed. The light from the light source 110 may sequentially pass through the color conversion layer 144 and the color layer 142. The color of the light from the light source 110 that has passed through the color conversion layer 144 and the color layer 142 may include white. The color of the light from the light source 110, which is emitted from the vehicle lamp 100 and observed externally, may be white. For example, the color of the color conversion layer 144 may be complementary to the color of the color layer 142.

Meanwhile, the color of the light from the light source 110 that has passed through the color conversion layer 144 and the color layer 142 may be white, but the present disclosure is not limited thereto. Alternatively, the light from the light source 110 that has passed through the color conversion layer 144 and the color layer 142 may have a predetermined color. The light from the light source 110 that has passed through the color conversion layer 144 and the color layer 142 will hereinafter be described as being white by way of example.

The functional layer 143 may be disposed between the color layer 142 and the color conversion layer 144. The color layer 142 may be disposed on the outer side of the vehicle lamp 100 compared to the color conversion layer 144. As mentioned earlier, the functional layer 143 may block or limit the transmission of the ambient light 1000 to the color conversion layer 144. As a result, the reflected light formed by the reflection of the ambient light 1000 on the main film 140 may primarily include the color of the color layer 142 and may not include the color of the color conversion layer 144.

The pattern layer 145 may transmit the light from the light source 110 in a predetermined pattern. The pattern layer 145 may include a light-blocking portion **145*a* and a light-transmitting portion 145*b*. The light-blocking portion 145*a* may block light. For example, the light-blocking portion 145*a* may be formed of a black material to prevent the light from the light source 110 from being emitted to the outside. The light-transmitting portion 145*b* may transmit light in the predetermined pattern. For example, the light-transmitting portion 145*b*** may be formed in a particular shape.

Figure 2:
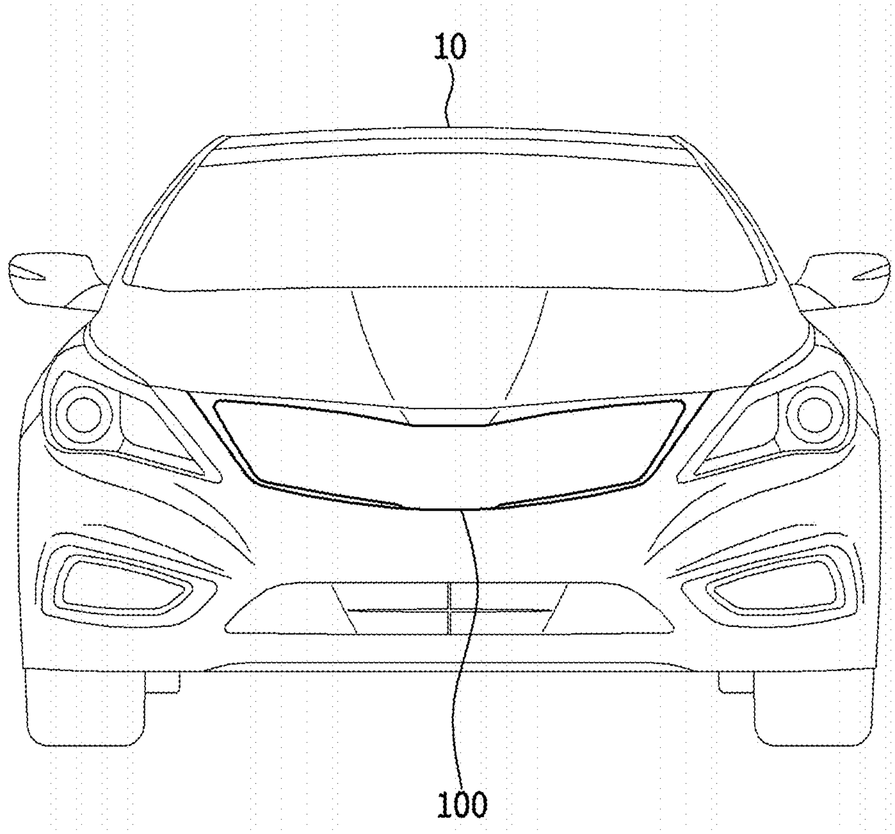
FIG. 2 illustrates a vehicle equipped with the vehicle lamp of FIG. 1.
Figure 3:
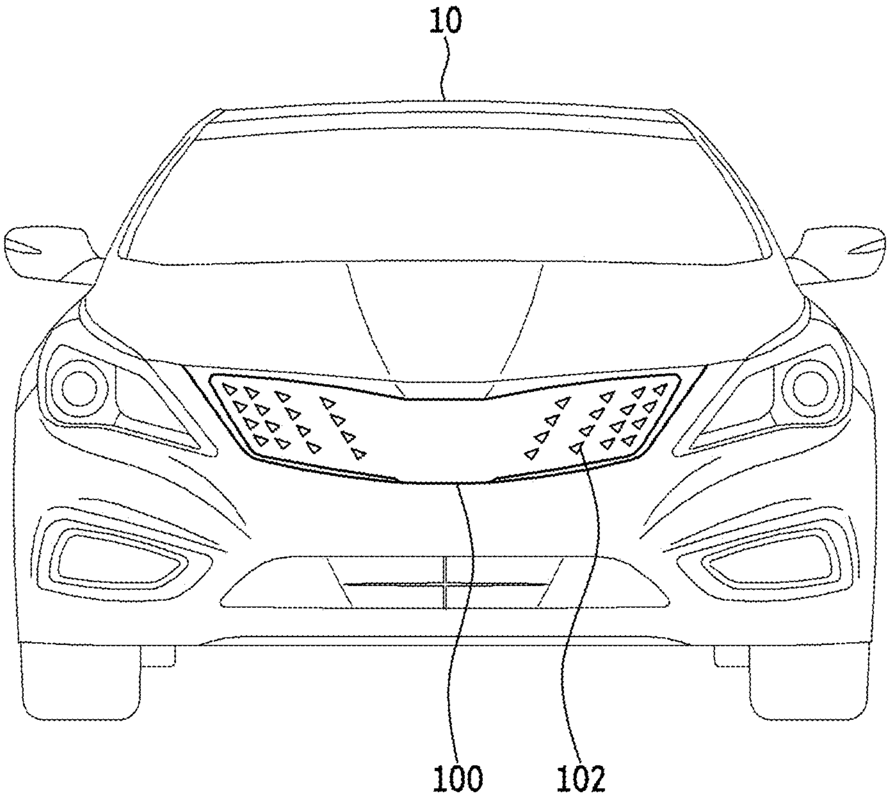
FIG. 3 is a diagram for explaining the operation of the vehicle lamp of FIG. 1.

FIG. 2 illustrates a vehicle equipped with the vehicle lamp of FIG. 1, and FIG. 3 is a diagram for explaining the operation of the vehicle lamp of FIG. 1. Referring to FIG. 2, the vehicle lamp 100 may be provided in a vehicle 10. If the vehicle 10 is an electric vehicle, it may not require a radiator grill. In this case, as illustrated in FIG. 2, the vehicle lamp 100 may be provided on the front of the vehicle 10. Meanwhile, FIG. 2 illustrates the vehicle lamp 100 as being provided on the front of the vehicle 10, but the present disclosure is not limited thereto. Alternatively, the vehicle lamp 100 may be provided on the side or rear of the vehicle 10. The vehicle lamp 100 will hereinafter be described as being provided on the front of the vehicle 10.

The color of the color layer 142 provided in the vehicle lamp 100 may be the same as the color of the body of the vehicle 10. In this case, the vehicle lamp 100 may be observed as being integrated with the body of the vehicle 10.

Referring to FIG. 3, when the light source 110 provided in the vehicle lamp 100 is turned on, pattern light 102 may be observed through the surface of the vehicle lamp 100. In other words, other parts of the surface of the vehicle lamp 100 may be observed in the color corresponding to the color layer 142 due to the reflection of the ambient light 1000, and the pattern light 102 may be observed through the light-transmitting portion **145*b*. The pattern light 102 may be formed as the light from the light source 110 sequentially passes through the color conversion layer 144 and the color layer 142. Therefore, the pattern light 102** may be observed as white.

When the light source 110 is turned off, an observer may recognize the entire surface of the vehicle lamp 100 as being composed of the color layer 142, as illustrated in FIG. 2. When the light source 110 is turned on, the user may recognize that part of the surface of the vehicle lamp 100 is composed of the pattern light 102 and the remaining part of the surface of the vehicle lamp 100 is composed of the color layer 142, as illustrated in FIG. 3.

Figure 4:
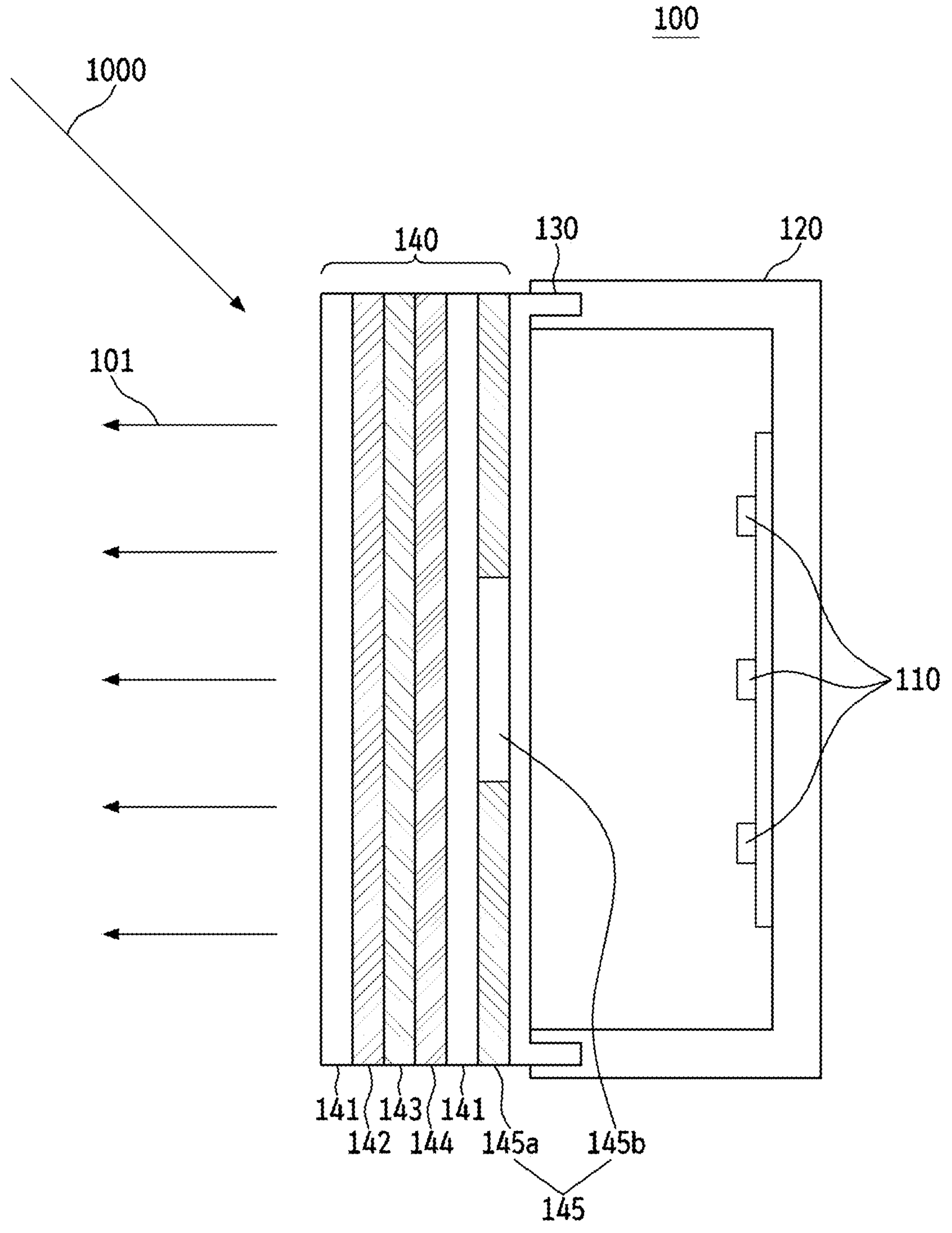
FIG. 4 illustrates reflected light being emitted by the vehicle lamp of FIG. 1.
Figure 5:
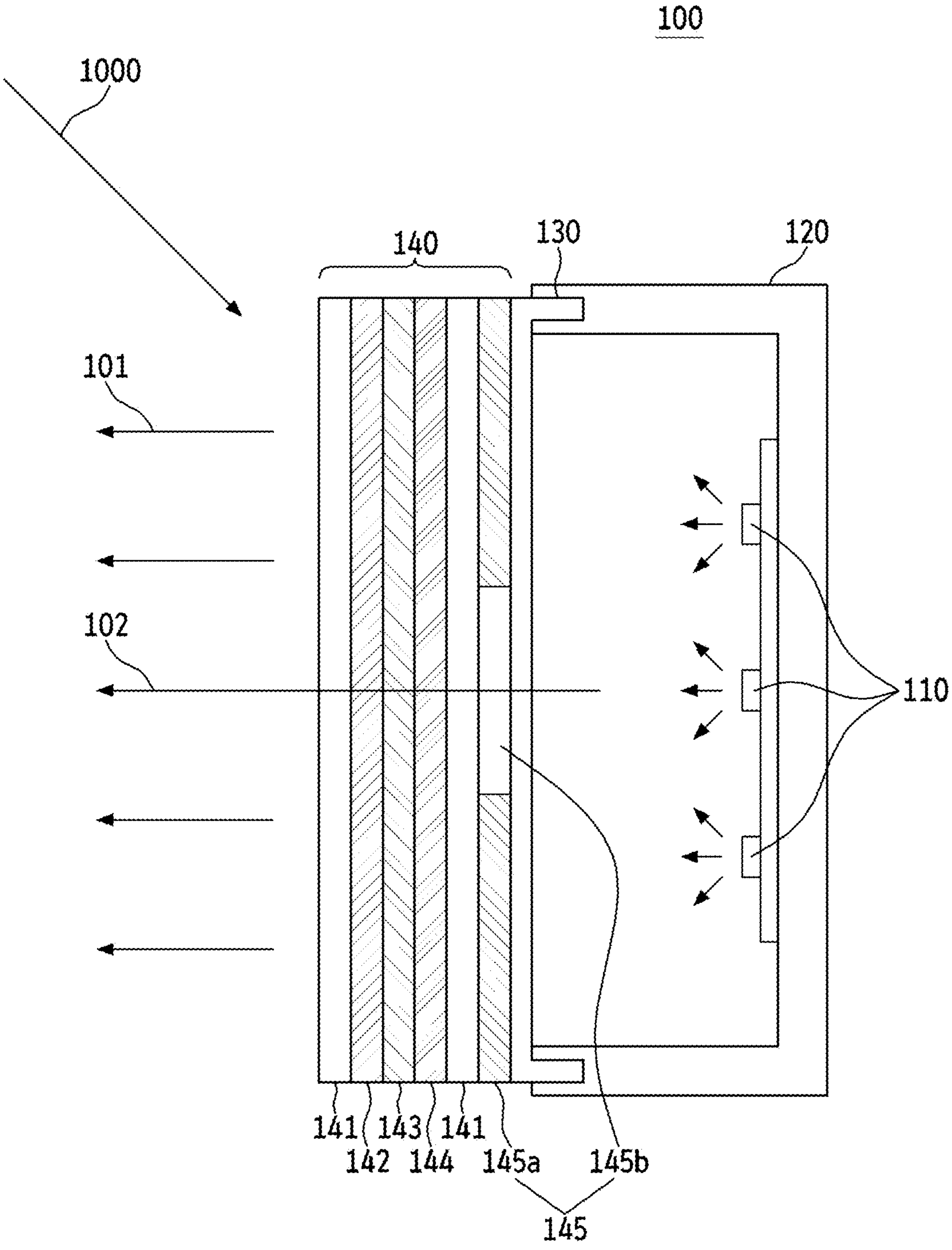
FIG. 5 illustrates pattern light being emitted by the vehicle lamp of FIG. 1.

FIG. 4 illustrates reflected light being emitted by the vehicle lamp of FIG. 1, and FIG. 5 illustrates pattern light being emitted by the vehicle lamp of FIG. 1. Referring to FIG. 4, when the light source 110 is turned off and the ambient light 1000 is incident, the vehicle lamp 100 may emit reflected light 101.

The ambient light 1000 may pass through the outermost protective layer 141 and may be transmitted to the color layer 142, where it may be reflected. The reflected light 101 of the vehicle lamp 100 may be the ambient light 1000 reflected by the color layer 142. Therefore, the reflected light 101 may be observed in the color of the color layer 142.

The functional layer 143 may have a semi-transmissive property. Accordingly, some of the ambient light 1000 may be reflected by the functional layer 143, and some of the ambient light 1000 may pass through the functional layer 143. The functional layer 143 may be disposed between the color layer 142 and the color conversion layer 144. Consequently, the light reflected by the functional layer 143 may only include the color of the color layer 142 and may not include the color of the color conversion layer 144. Therefore, the reflected light 101 may only include the color of the color layer 142, allowing the observer to observe the reflected light 101 as having the same color as the body of the vehicle 10.

Referring to FIG. 5, when the light source 110 is turned on, the vehicle lamp 100 may emit the pattern light 102. The pattern layer 145 may be disposed between the light source 110 and the functional layer 143. The light emitted from the light source 110 may sequentially pass through the light-transmitting portion **145*b* of the pattern layer 145, the color conversion layer 144, the functional layer 143, and the color layer 142. The functional layer 143, having a semi-transmissive property, may transmit some of the light from the light source 110** therethrough.

As the light from the light source 110 sequentially passes through the color conversion layer 144 and the color layer 142, the color of the light from the light source 110 may be converted into white. Accordingly, the pattern light 102 may be observed as white.

When the light source 110 is turned on, ambient light 1000 may be irradiated to the vehicle lamp 100. In this case, the reflected light 101, having the color of the color layer 142, and the white pattern light 102 may both be observed. The surface of the vehicle lamp 100, having the color of the color layer 142, may include the white pattern light 102.

Figure 6:
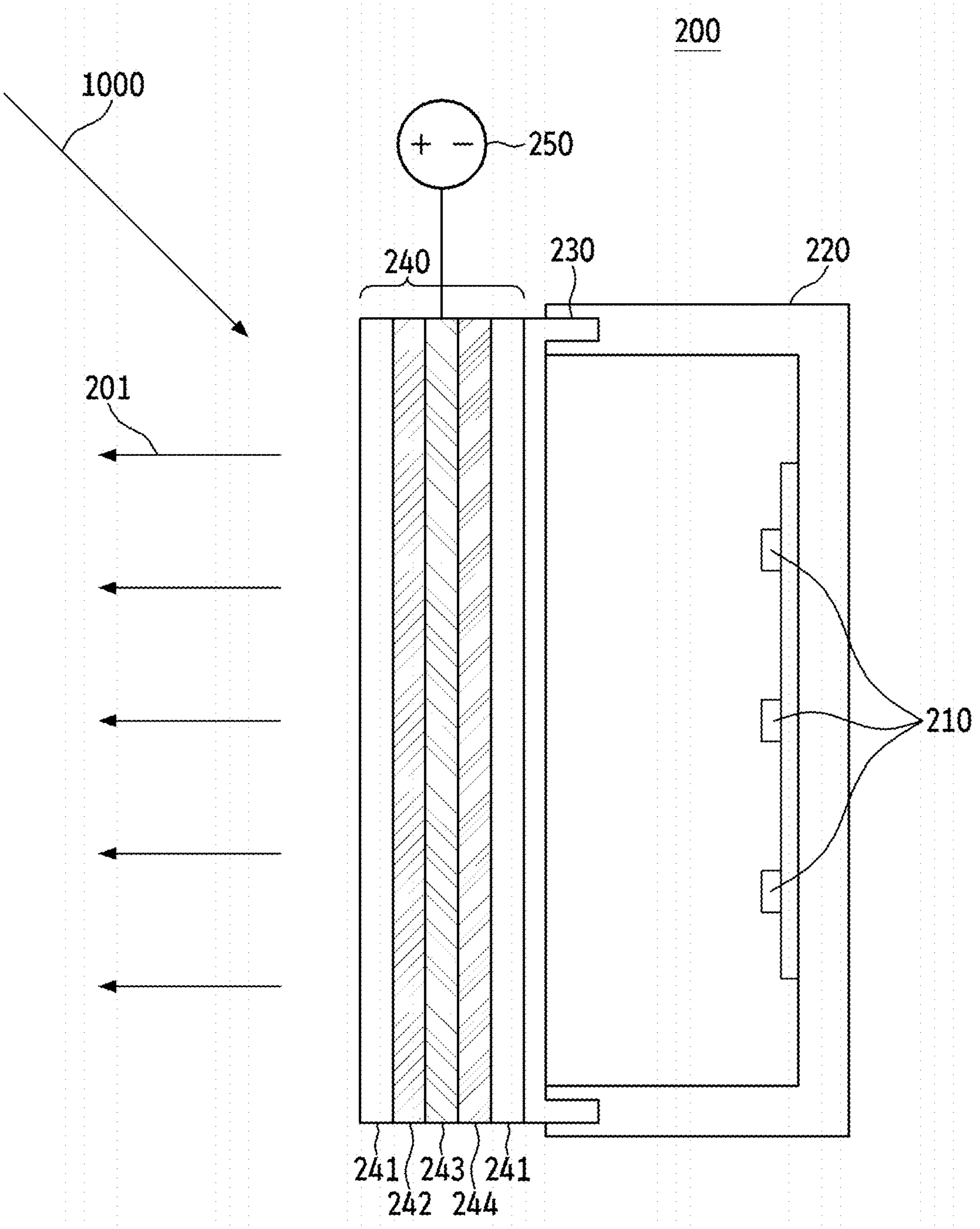
FIG. 6 illustrates a vehicle lamp according to an embodiment of the present disclosure.
Figure 7:
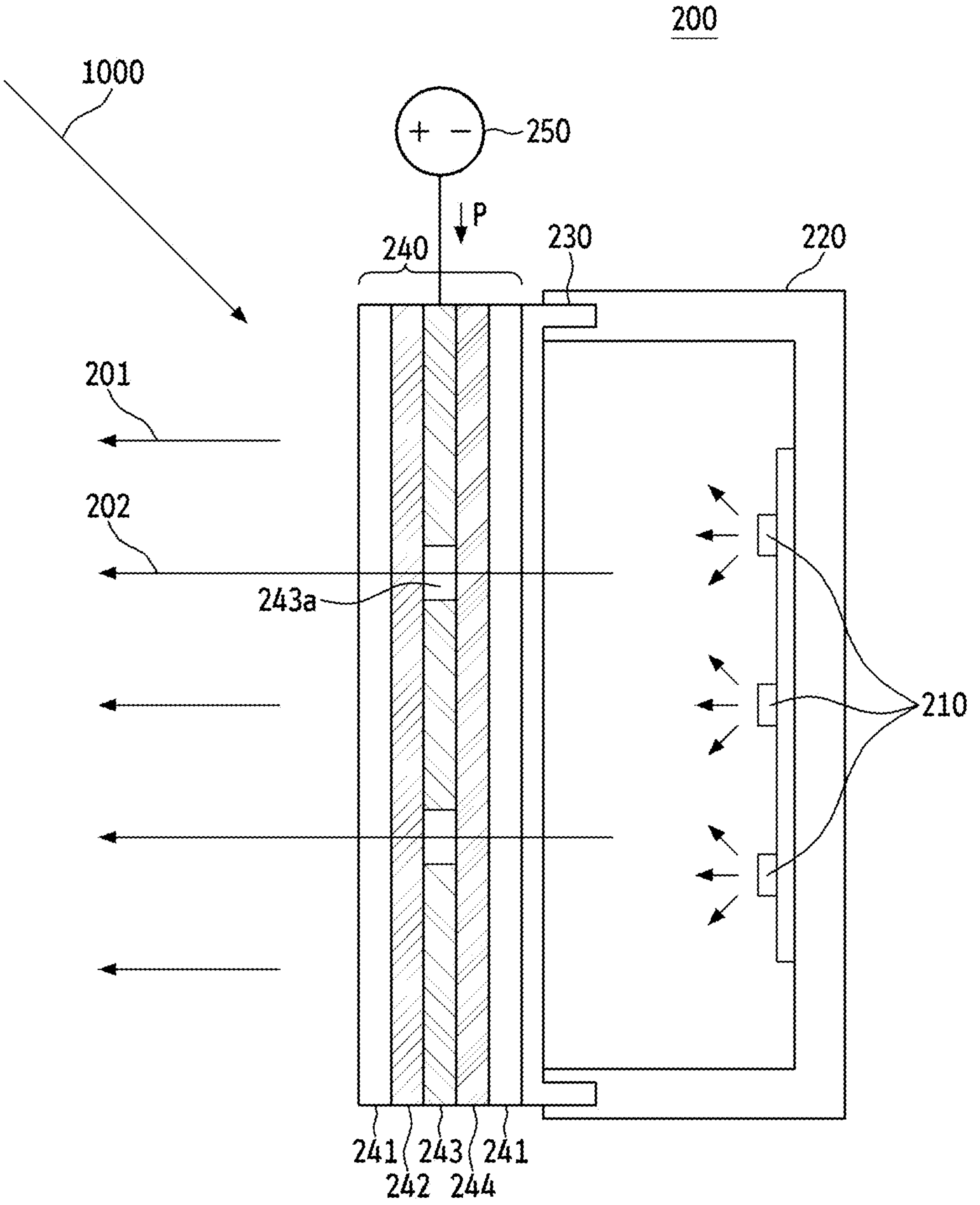
FIG. 7 illustrates pattern light being emitted by the vehicle lamp of FIG. 6.

FIG. 6 illustrates a vehicle lamp according to a second embodiment of the present disclosure, and FIG. 7 illustrates pattern light being emitted by the vehicle lamp of FIG. 6. Referring to FIGS. 6 and 7, a vehicle lamp 200 may include a light source 210, a housing 220, a lens 230, a main film 240, and a power supply unit 250.

The light source 210 may emit light. The housing 220 may accommodate the light source 210. The lens 230 may be disposed in the light emission path of the light source 210. The main film 240 may be attached to the lens 230. The light from the light source 210 may pass through the lens 230 and then through the main film 240. The functions of the light source 210, the housing 220, the lens 230, and the main film 240 of the vehicle lamp 200 are the same as or similar to those of the light source 110, the housing 120, the lens 130, and the main film 140 of the vehicle lamp 100 according to the first embodiment, and the vehicle lamp 200 will hereinafter be described, focusing mainly on the differences from the vehicle lamp 100.

The main film 240 may include protective layers 241, a color layer 242, a functional layer 243, and a color conversion layer 244.

The protective layers 241 may protect the color layer 242, the functional layer 243, and the color conversion layer 244. To this end, the protective layers 241 may have a relatively high rigidity. Additionally, the protective layers 241 may have a relatively high light transmittance. The color layer 242, the functional layer 243, and the color conversion layer 244 may be disposed between two protective layers 241. The protective layer 241 may prevent damage to the color layer 242, the functional layer 243, and the color conversion layer 244.

The color layer 242 may reflect ambient light 1000 in a predetermined color. For example, the color layer 242 may be filled with paint of a particular color.

The functional layer 243 may selectively transmit the light from the light source 210 therethrough. For example, the functional layer 243 may block or transmit therethrough the light from the light source 210.

The functional layer 243 may selectively transmit the light from the light source 210 using at least one of a suspended particle device (SPD) method, a polymer dispersed liquid crystal (PDLC) method, an electrophoresis method, or an electrochromic (EC) method. When power is not supplied from the power supply unit 250, the functional layer 243 may block the light from the light source 210, and when power is supplied from the power supply unit 250, the functional layer 243 may transmit the light from the light source 210 therethrough.

The color conversion layer 244 may convert the light from the light source 210 into a predetermined color. As the light from the light source 210 passes through the color conversion layer 244, the color of the light may be changed. The light from the light source 210 may sequentially pass through the color conversion layer 244 and the color layer 242. The color of the light from the light source 210 that has passed through the color conversion layer 244 and the color layer 242 may include white. The color of the light from the light source 210, which is emitted from the vehicle lamp 200 and observed externally, may be white. For example, the color of the color conversion layer 244 may be complementary to the color of the color layer 242.

The functional layer 243 may be disposed between the color layer 242 and the color conversion layer 244. The color layer 242 may be disposed on the outer side of the vehicle lamp 200 compared to the color conversion layer 244. The functional layer 243 may block the transmission of ambient light 1000 to the color conversion layer 244. As a result, reflected light 201, formed by the reflection of the ambient light 1000 on the main film 240, may primarily include the color of the color layer 242 and may not include the color of the color conversion layer 244.

The power supply unit 250 may supply direct current (DC) power P to the functional layer 243. When the DC power P is not supplied from the power supply unit 250, the internal particles of the functional layer 243 may be arranged to block light, and when the DC power P is supplied from the power supply unit 250, the internal particles of the functional layer 243 may be arranged to transmit light therethrough.

As illustrated in FIG. 6, when the light source 210 is turned off and the ambient light 1000 is incident, the vehicle lamp 200 may emit the reflected light 201. The ambient light 1000 may pass through the outermost protective layer 241 and may be transmitted to the color layer 242, where it may be reflected. The reflected light 201 of the vehicle lamp 200 may be the ambient light 1000 reflected by the color layer 242. Therefore, the reflected light 201 may be observed in the color of the color layer 242.

When power is not supplied, the functional layer 243 may block the ambient light 1000. The functional layer 243 may be disposed between the color layer 242 and the color conversion layer 244. Thus, the light reflected by the functional layer 243 may include only the color of the color layer 242 and not the color of the color conversion layer 244. As a result, the reflected light 201 may include only the color of the color layer 242, allowing a viewer to observe the reflected light 201 as having the same color as the body of the vehicle 10.

As illustrated in FIG. 7, when the light source 210 is turned on, the vehicle lamp 200 may emit pattern light 202. When the light source 210 is turned on, the power supply unit 250 may supply the DC power P to the functional layer 243. When the DC power P is supplied to the functional layer 243, the internal particles of the functional layer 243 may be rearranged to form a light-transmitting portion 243*a*. The light from the light source 210 may sequentially pass through the light-transmitting portion 243*a*, the color conversion layer 244, and the color layer 242.

As the light from the light source 210 sequentially passes through the color conversion layer 244 and the color layer 242, the color of the light from the light source 210 may be converted into white. Accordingly, the pattern light 202 may be observed as white.

When the light source 210 is turned on, the ambient light 1000 may be irradiated to the vehicle lamp 200. In this case, the reflected light 201, having the color of the color layer 242, and the white pattern light 202 may both be observed. The surface of the vehicle lamp 200, having the color of the color layer 242, may include the white pattern light 202.

Figure 8:
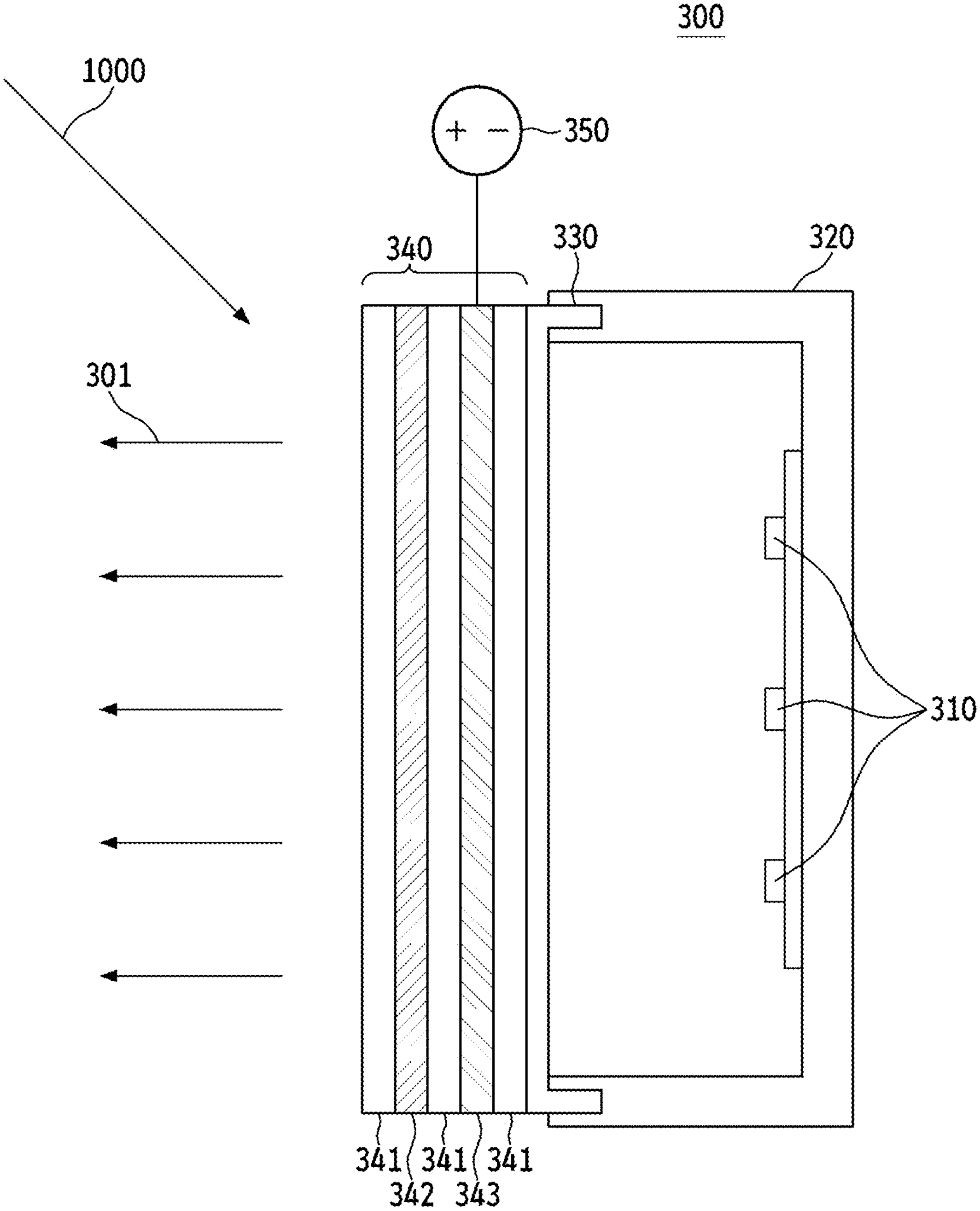
FIG. 8 illustrates a vehicle lamp according to an embodiment of the present disclosure.
Figure 9:
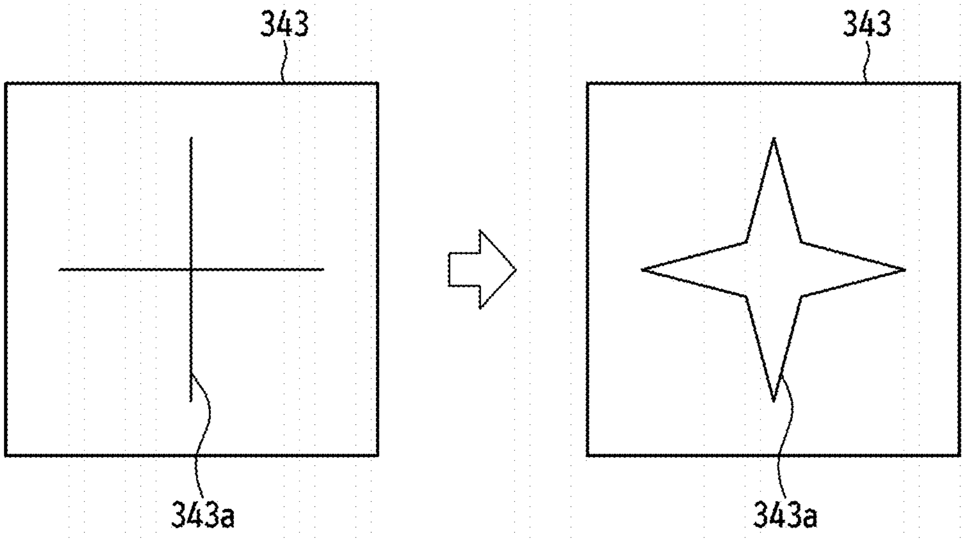
FIG. 9 is a diagram explaining the operation of a functional layer using a piezoelectric method.
Figure 10:
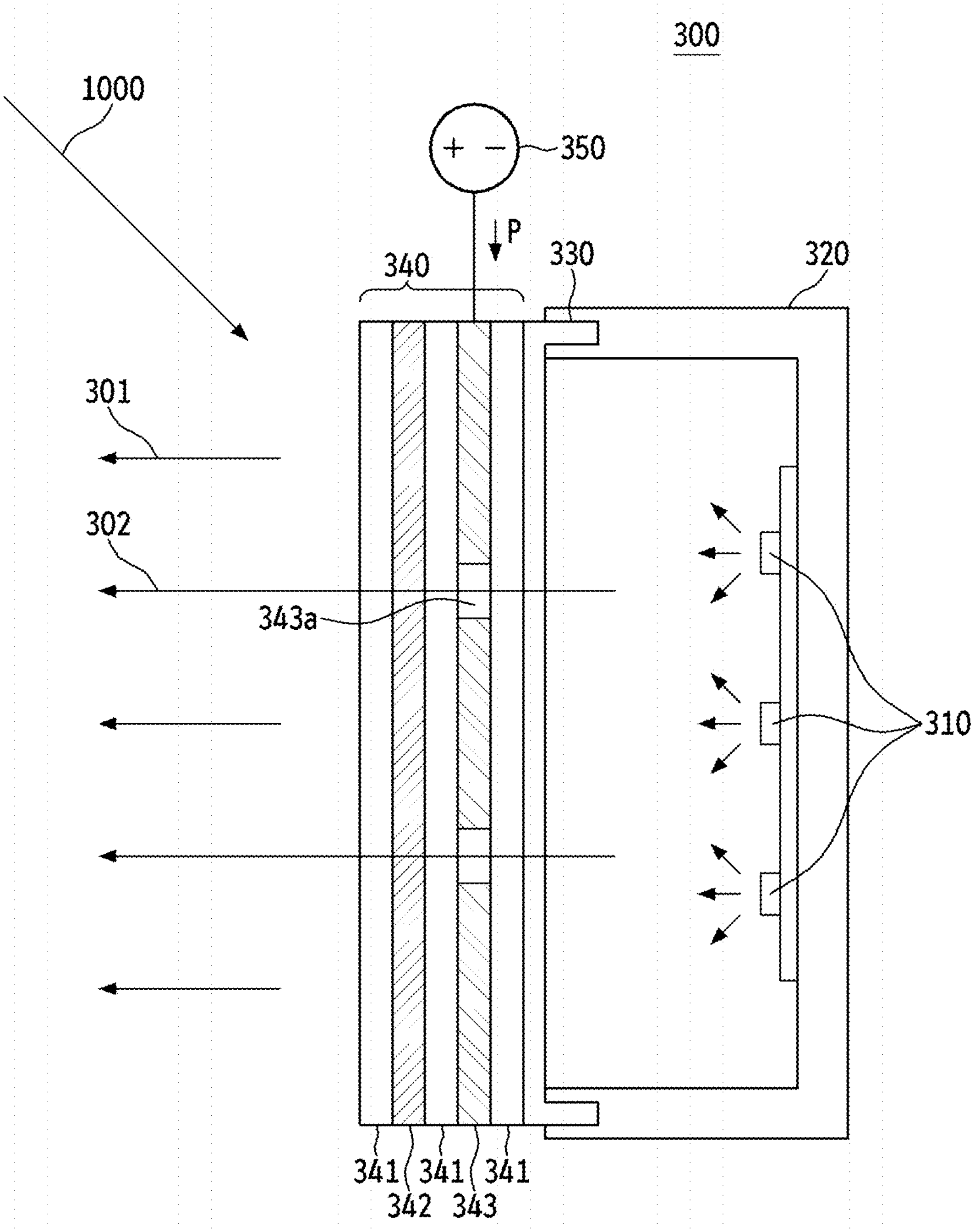
FIG. 10 illustrates pattern light being emitted by the vehicle lamp of FIG. 8.
Figure 11:
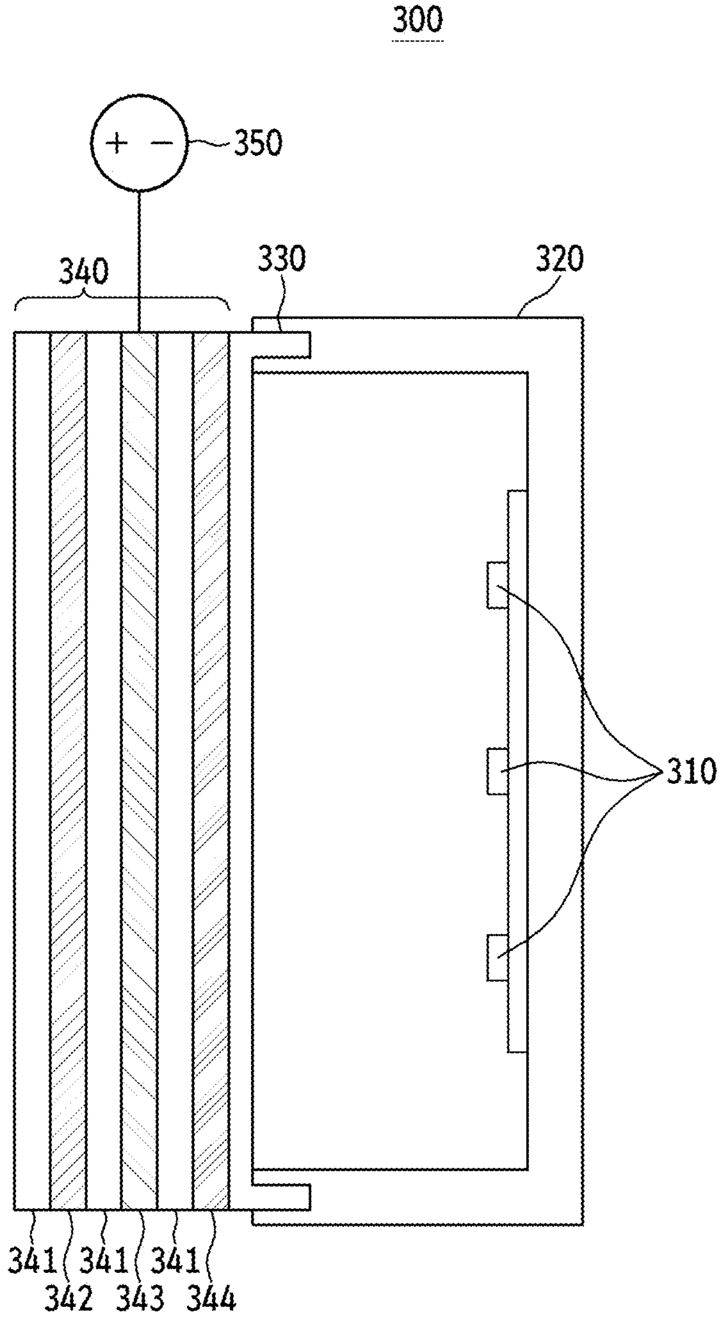
FIG. 11 illustrates a main film of the vehicle lamp of FIG. 8 that includes a correction layer.

FIG. 8 illustrates a vehicle lamp according to a third embodiment of the present disclosure, FIG. 9 is a diagram explaining the operation of a functional layer using a piezoelectric method, FIG. 10 illustrates pattern light being emitted by the vehicle lamp of FIG. 8, and FIG. 11 illustrates a main film of the vehicle lamp of FIG. 8 that includes a correction layer.

Referring to FIG. 8, a vehicle lamp 300 may include a light source 310, a housing 320, a lens 330, a main film 340, and a power supply unit 350.

The light source 310 may emit light. The housing 320 may accommodate the light source 310. The lens 330 may be disposed in the light emission path of the light source 310. The main film 340 may be attached to the lens 330. The light emitted from the light source 310 may pass through the lens 330 and then through the main film 340. The functions of the light source 310, the housing 320, the lens 330, and the main film 340 of the vehicle lamp 300 are the same as or similar to those of the light source 110, the housing 120, the lens 130, and the main film 140 of the vehicle lamp 100 or 200 according to the first and second embodiments, and the vehicle lamp 300 will hereinafter be described, focusing mainly on the differences from the vehicle lamp 100 or 200.

The main film 340 may include protective layers 341, a color layer 342, and a functional layer 343. The protective layers 341 may protect the color layer 342 and the functional layer 343. To this end, the protective layers 341 may have a relatively high rigidity. Additionally, the protective layers 341 may have a relatively high light transmittance. In this embodiment, the main film 340 may include three protective layers 341. The color layer 342 and the functional layer 343 may be disposed between each pair of adjacent protective layers 341. The protective layers 341 may prevent damage to the color layer 342 and the functional layer 343.

The color layer 342 may reflect ambient light 1000 in a predetermined color. For example, the color layer 342 may be filled with paint of a particular color.

The functional layer 343 may selectively transmit the light from the light source 310 therethrough. For example, the functional layer 343 may block or transmit therethrough the light from the light source 310.

The functional layer 343 may selectively transmit the light from the light source 310 therethrough using a piezoelectric device. When power is not supplied from the power supply unit 350, the functional layer 343 may block the light from the light source 310, and when power is supplied from the power supply unit 350, the functional layer 343 may transmit the light from the light source 310 therethrough.

Referring to FIG. 9, the shape of the functional layer 343 may be altered depending on whether the DC power P is supplied.

The functional layer 343 may include a light-transmitting portion 343*a*. When the DC power P is not supplied, the light-transmitting portion 343*a* may be provided in the form of a slit. In this case, the functional layer 343 may essentially block light. Meanwhile, when the DC power P is supplied, the light-transmitting portion 343*a* may form opening of a particular shape. In this case, the functional layer 343 may transmit light therethrough.

Referring again to FIG. 8, the color of the light from the light source 310 may be determined so that white light may be observed when the light from the light source 310 passes through the color layer 342. For example, the color of the light from the light source 310 may be complementary to the color of the color layer 342.

The power supply unit 350 may supply the DC power P to the functional layer 343. When the DC power P is not supplied from the power supply unit 350, the functional layer 343 may block light, and when the DC power P is supplied from the power supply unit 350, the functional layer 343 may transmit light therethrough.

As illustrated in FIG. 8, when the light source 310 is turned off and ambient light 1000 is incident, the vehicle lamp 300 may emit reflected light 301.

The ambient light 1000 may pass through the outermost protective layer 341 and may be transmitted to the color layer 342, where it may be reflected. The reflected light 301 of the vehicle lamp 300 may be the ambient light 1000 reflected by the color layer 342. Therefore, the reflected light 301 may be observed in the color of the color layer 342.

As illustrated in FIG. 10, when the light source 310 is turned on, the vehicle lamp 300 may emit pattern light 302. In conjunction with the light source 310 being turned on, the power supply unit 350 may supply the DC power P to the functional layer 343. When the DC power P is supplied to the functional layer 343, the functional layer 343 may deform due to the piezoelectric behavior, allowing the light-transmitting portion 343*a* to transmit light therethrough. The light from the light source 310 may pass through the light-transmitting portion 343*a* and then through the color layer 342.

As the light from the light source 310, which has a color complementary to the color of the color layer 342, passes through the color layer 342, its color may be converted into white. Accordingly, the pattern light 302 may be observed as white.

When the light source 310 is turned on, the ambient light 1000 may be irradiated to the vehicle lamp 300. In this case, the reflected light 301, having the color of the color layer 342, and the white pattern light 302 may both be observed. The surface of the vehicle lamp 300, having the color of the color layer 342, may include the white pattern light 302.

Referring to FIG. 11, in some embodiments, the main film 340 may further include a correction layer 344. The correction layer 344 may correct the color of the light from the light source 310.

When the color of the light from the light source 310 is complementary to the color of the color layer 342, the light from the light source 310 that has passed through the color layer 342 may be observed as white. However, depending on the type of the color layer 342, it may not be easy to obtain a light source 310 with a complementary color. In this case, the correction layer 344 may correct the color of the light from the light source 310 so that the final pattern light 302 may be observed as white. As such, the correction layer 344 may be implemented with an optical filter.

Figure 12:
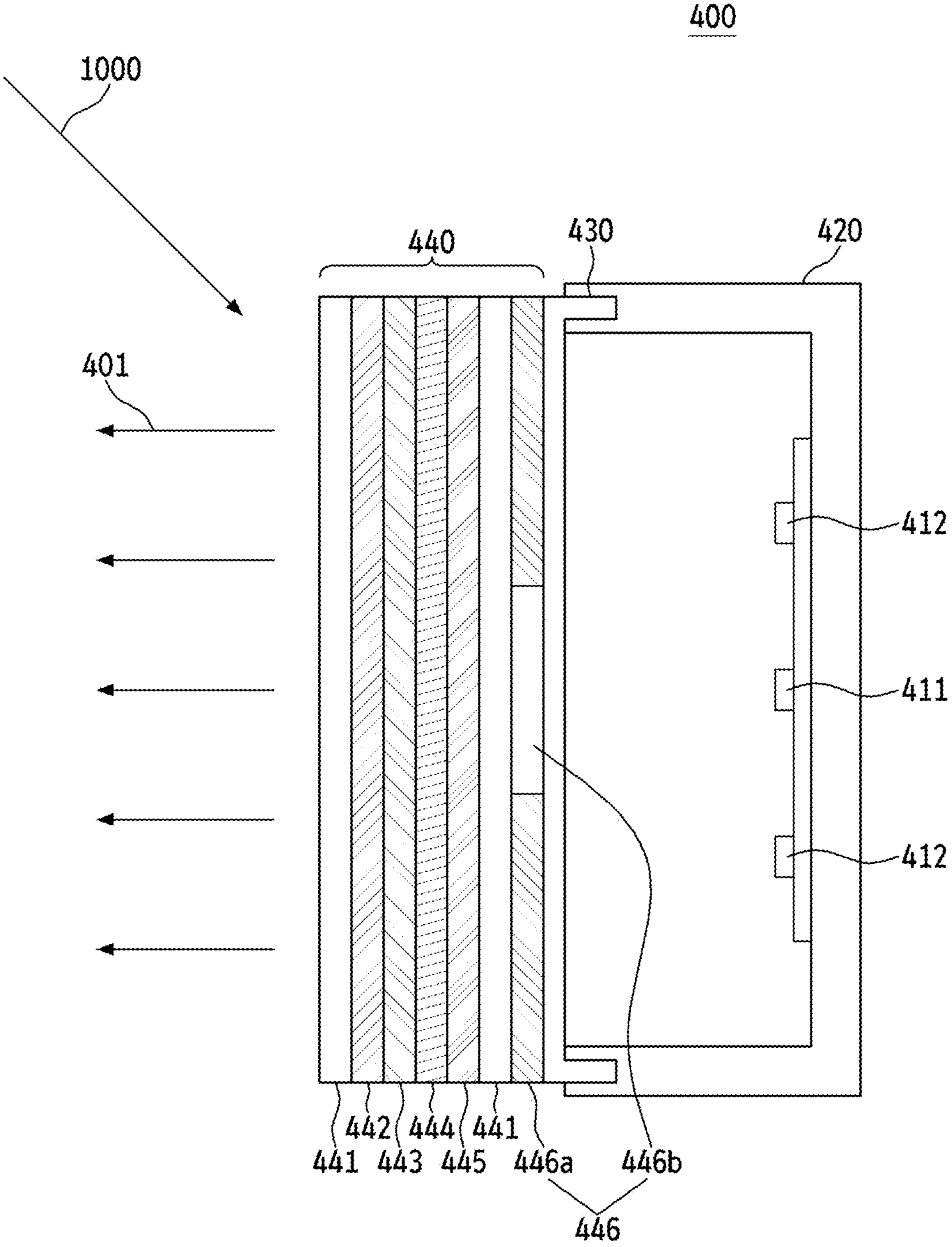
FIG. 12 illustrates a vehicle lamp according to an embodiment of the present disclosure.
Figure 13:
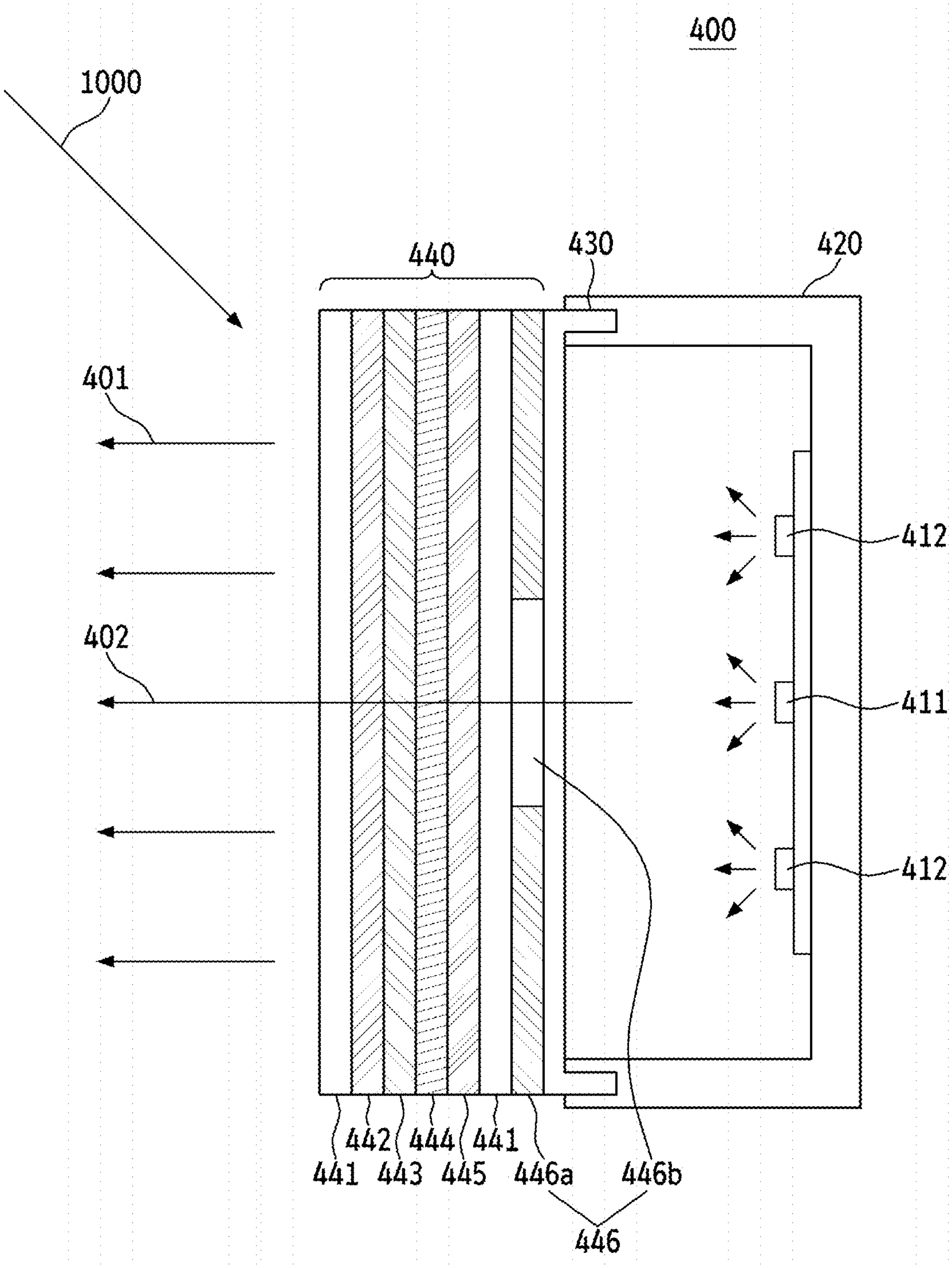
FIG. 13 illustrates pattern light being emitted by the vehicle lamp of FIG. 12.

FIG. 12 illustrates a vehicle lamp according to a fourth embodiment of the present disclosure, and FIG. 13 illustrates pattern light being emitted by the vehicle lamp of FIG. 12. Referring to FIGS. 12 and 13, a vehicle lamp 400 may include light sources (411 and 412), a housing 420, a lens 430, and a main film 440.

The light sources 411 and 412 may emit light. The housing 420 may accommodate the light sources 411 and 412. The lens 430 may be disposed in the light emission path of the light sources 411 and 412. The main film 440 may be attached to the lens 430. The light from the light sources 411 and 412 may pass through the lens 430 and then through the main film 440. The functions of the light sources 411 and 412, the housing 420, the lens 430, and the main film 440 of the vehicle lamp 400 are the same as or similar to those of the light source 110, the housing 120, the lens 130, and the main film 140 of the vehicle lamp 100, 200, or 300 according to the first, second, and third embodiments, and thus, the vehicle lamp 400 will hereinafter be described, focusing mainly on the differences from the vehicle lamp 100, 200, or 300.

The light sources 411 and 412 may include a first light source 411 and one or more second light sources 412. The first light source 411 may emit visible light, and the second light sources 412 may emit ultraviolet (UV) light.

The main film 440 may include protective layers 441, a color layer 442, a functional layer 443 and 444, a color conversion layer 445, and a pattern layer 446.

The protective layers 441 may protect the color layer 442, the functional layer 443 and 444, and the color conversion layer 445. To this end, the protective layers 441 may have a relatively high rigidity. Additionally, the protective layers 441 may have a relatively high light transmittance. The color layer 442, the functional layer 443 and 444, and the color conversion layer 445 may be disposed between two protective layers 441. The protective layers 441 may prevent damage to the color layer 442, the functional layer 443 and 444, and the color conversion layer 445.

The color layer 442 may reflect ambient light 1000 in a predetermined color. For example, the color layer 442 may be filled with paint of a particular color.

The functional layer 443 and 444 may selectively transmit the light from the light sources 411 and 412. For example, the functional layer 443 and 444 may block or transmit therethrough the light from the light sources 411 and 412.

The functional layer 443 and 444 may include a UV blocking layer 443 and a UV activating layer 444. The UV blocking layer 443 may block UV light. Specifically, the UV blocking layer 443 may prevent UV light emitted by the second light sources 412 from being emitted to the outside.

The UV activating layer 444 may change its transmittance for visible light when UV light is incident. The transmittance of the UV activating layer 444 for visible light may change depending on whether UV light is incident. Specifically, when UV light is not incident, the UV activating layer 444 may block visible light, and when UV light is incident, the UV activating layer 444 may transmit visible light therethrough. Here, UV light may be emitted by the second light sources 412. Thus, the UV activating layer 444 may transmit visible light from the first light source 411 therethrough when UV light from the second light source 412 is incident, and may block the visible light from the first light source 411 when the UV light from the second light source 412 is not incident.

The UV activating layer 444 may be disposed between the UV blocking layer 443 and the light sources 411 and 412. Even if UV light is emitted by the second light source 412, it may be blocked by the UV blocking layer 443 disposed in front and may thus be prevented from being emitted to the outside of the lamp.

The color conversion layer 445 may convert the light from the first light source 411 into a predetermined color. As the light from the first light source 411 passes through the color conversion layer 445, the color of the light may be changed. The light from the first light source 411 may sequentially pass through the color conversion layer 445 and the color layer 442. The color of the light from the first light source 411 that has passed through the color conversion layer 445 and the color layer 442 may include white. The color of the light from the first light source 411, which is emitted from the vehicle lamp 400 and observed externally, may be white. For example, the color of the color conversion layer 445 may be complementary to the color of the color layer 442.

The functional layer 443 and 444 may be disposed between the color layer 442 and the color conversion layer 445. The color layer 442 may be disposed on the outer side of the vehicle lamp 400 compared to the color conversion layer 445. When the second light source 412 is not emitting UV light, the UV blocking layer 443 of the functional layer 443 and 444 may block the ambient light 1000 from being transmitted to the color conversion layer 445. As a result, reflected light 401 formed by the reflection of the ambient light 1000 on the main film 440 may primarily include the color of the color layer 442 and may not include the color of the color conversion layer 445.

The pattern layer 446 may transmit the light from the light sources 411 and 412 in a predetermined pattern. The pattern layer 446 may include a light-blocking portion **446*a* and a light-transmitting portion 446*b*. The light-blocking portion 446*a* may block light. For example, the light-blocking portion 446*a* may be formed of a black material to prevent the light from the light sources 411 and 412 from being emitted to the outside. The light-transmitting portion 446*b* may transmit light in a predetermined pattern. For example, the light-transmitting portion 446*b*** may be provided with an opening having a particular shape.

As illustrated in FIG. 12, when the light sources 411 and 412 are turned off and the ambient light 1000 is incident, the vehicle lamp 400 may emit the reflected light 401. The ambient light 1000 may pass through the outermost protective layer 441 and may be transmitted to the color layer 442, where it may be reflected. The reflected light 401 of the vehicle lamp 400 may be the ambient light 1000 reflected by the color layer 442. Therefore, the reflected light 401 may be observed in the color of the color layer 442.

When the second light source 412 is not emitting UV light, the UV activating layer 444 of the functional layer 443 and 444 may block the ambient light 1000. The functional layers 443 and 444 may be interposed between the color layer 442 and the color conversion layer 445. As a result, the light reflected by the functional layers 443 and 444 may only include the color of the color layer 442 and may not include the color of the color conversion layer 445. Therefore, the reflected light 401 may only include the color of the color layer 442, allowing the viewer to observe the reflected light 401 as having the same color as the body of the vehicle 10.

As illustrated in FIG. 13, when the light sources 411 and 412 are turned on, the vehicle lamp 400 may emit pattern light 402. The first light source 411 may emit visible light, and the second light sources 412 may emit UV light. The UV activating layer 444, upon receiving UV light from the second light source 412, may transmit visible light from the first light source 411.

The visible light from the first light source 411 and the UV light from the second light sources 412 may sequentially pass through the light-transmitting portion **446*b* of the pattern layer 446, the color conversion layer 445, and the color layer 442. As the light from the first light source 411 sequentially passes through the color conversion layer 445 and the color layer 442, the color of the light may be converted into white. Accordingly, the pattern light 402** may be observed as white.

When the light sources 411 and 412 are turned on, the ambient light 1000 may be irradiated to the vehicle lamp 400. In this case, the white pattern light 402 and the reflected light 401, having the color of the color layer 442, may both be observed. The surface of the vehicle lamp 400, having the color of the color layer 442, may include the white pattern light 402.

Figure 14:
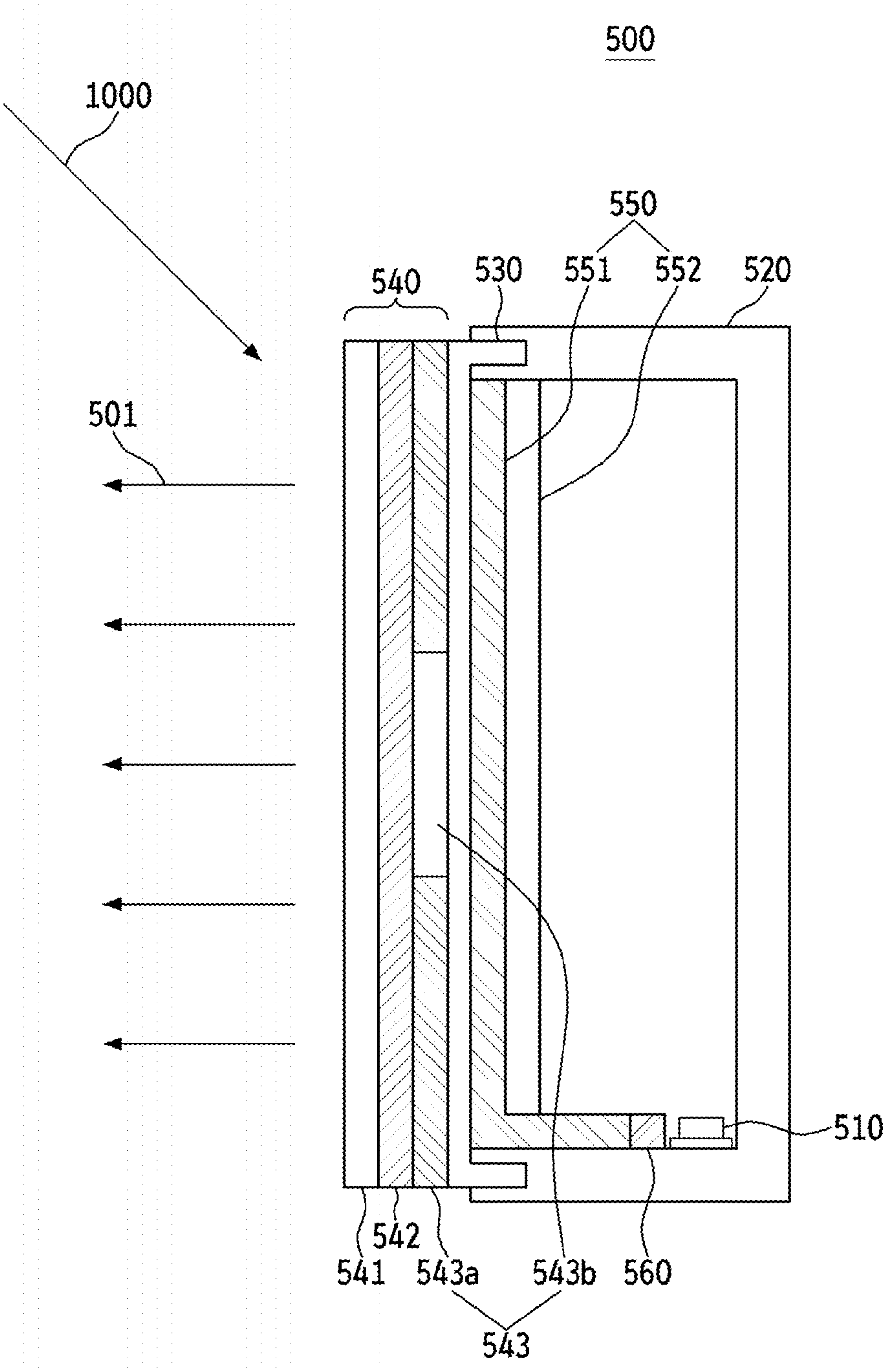
FIG. 14 illustrates a vehicle lamp according to an embodiment of the present disclosure.
Figure 15:
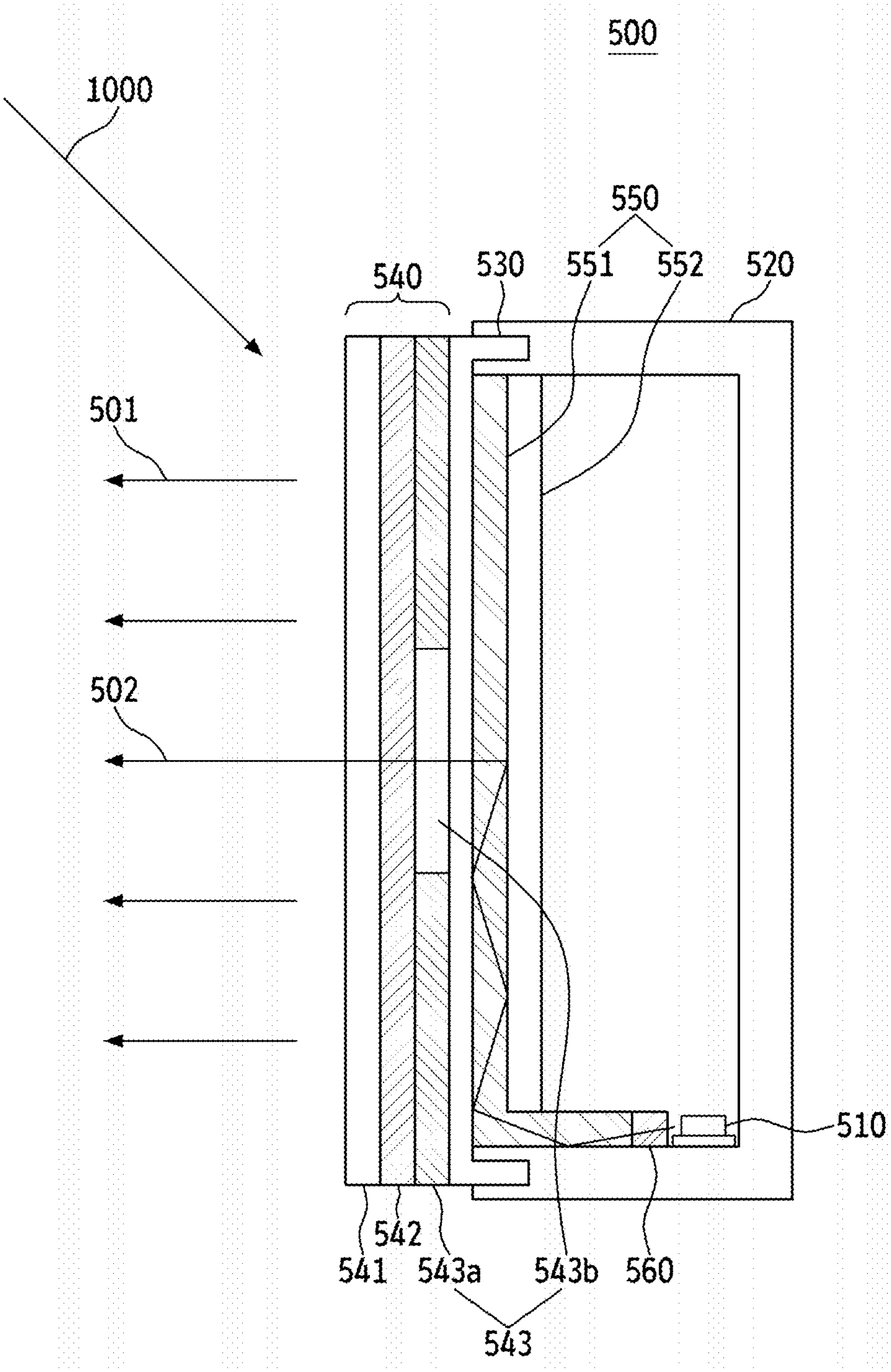
FIG. 15 illustrates pattern light being emitted by the vehicle lamp of FIG. 14.

FIG. 14 illustrates a vehicle lamp according to a fifth embodiment of the present disclosure, and FIG. 15 illustrates pattern light being emitted by the vehicle lamp of FIG. 14. Referring to FIGS. 14 and 15, a vehicle lamp 500 may include a light source 510, a housing 520, a lens 530, a main film 540, an auxiliary film 550, and a color filter 560.

The light source 510 may emit light. The housing 520 may accommodate the light source 510. The lens 530 may be disposed in the light emission path of the light source 510. The main film 540 may be attached to the lens 530. The light from the light source 510 may pass through the lens 530 and then through the main film 540. The functions of the light source 510, the housing 520, the lens 530, and the main film 540 of the vehicle lamp 500 are the same as or similar to those of the light source 110, the housing 120, the lens 130, and the main film 140 of the vehicle lamp 100, 200, 300, or 400 according to the first to fourth embodiments, and thus, detailed descriptions thereof will be omitted.

The main film 540 may include a protective layer 541, a color layer 542, and a pattern layer 543. The protective layer 541 may protect the color layer 542. To this end, the protective layer 541 may have a relatively high rigidity. Additionally, the protective layer 541 may have a relatively high light transmittance.

The color layer 542 may reflect ambient light 1000 in a predetermined color. For example, the color layer 542 may be filled with paint of a particular color. Similar to the above embodiments, the particular color may correspond to the body color of the vehicle.

The pattern layer 543 may transmit the light from the light source 510 in a predetermined pattern. The pattern layer 543 may include a light-blocking portion 543*a* and a light-transmitting portion 543*b*. The light-blocking portion 543*a* may block light. For example, the light-blocking portion 543*a* may be formed of a black (e.g., dark) material to prevent the light from the light source 510 from being emitted to the outside. The light-transmitting portion 543*b* may transmit light in a predetermined pattern. For example, the light-transmitting portion 543*b* may be provided with an opening having a particular shape.

The auxiliary film 550 may be attached to the lens 530. Specifically, the auxiliary film 550 may be attached to an inner side of the lens 530 where the main film 540 is not attached. The main film 540 may be exposed to the outside, while the auxiliary film 550 may be accommodated inside the housing 520 together with the light source 510.

The auxiliary film 550 may include a guide layer 551 and a reflective layer 552. The guide layer 551 may guide the light from the light source 510 based on total internal reflection. The light from the light source 510, incident on the guide layer 551, may be reflected on the surface of the guide layer 551 and move along the guide layer 551. As such, the guide layer 551 may function as an optical waveguide.

The reflective layer 552 may reflect the light moving along the guide layer 551 toward the main film 540. To this end, the guide layer 551 may be disposed between the main film 540 and the reflective layer 552.

In some embodiments, the color filter 560 may be disposed between the light source 510 and the guide layer 551 to convert the light from the light source 510 into a predetermined color. The color of the light from the light source 510 that has passed through the color filter 560 and the color layer 542 may include white. The color of the light from the light source 510, which is emitted from the vehicle lamp 500 and observed externally, may be white. For example, the color of the color filter 560 may be complementary to the color of the color layer 542. In some embodiments, the color filter 560 may be omitted, and the light source 510 may be implemented to emit light having a color that is complementary to the color of the color layer 542.

As illustrated in FIG. 14, when the light source 510 is turned off and ambient light 1000 is incident, the vehicle lamp 500 may emit reflected light 501. The ambient light 1000 may pass through the outermost protective layer 541 and may be transmitted to the color layer 542, where it may be reflected. The reflected light 501 of the vehicle lamp 500 may be the ambient light 1000 reflected by the color layer 542. Therefore, the reflected light 501 may be observed in the color of the color layer 542.

As illustrated in FIG. 15, when the light source 510 is turned on, the vehicle lamp 500 may emit pattern light 502. The light from the light source 510 may be guided along the guide layer 551 after its color is converted by the color filter 560. The light from the light source 510 may be reflected by the reflective layer 552 and may then sequentially pass through the light-transmitting portion 543*b* of the pattern layer 543 and the color layer 542.

As the light from the light source 510 sequentially passes through the color filter 560 and the color layer 542, the color of the light may be converted to white. Accordingly, the pattern light 502 may be observed as white.

When the light source 510 is turned on, the ambient light 1000 may be irradiated to the vehicle lamp 500. In this case, the reflected light 501, having the color of the color layer 542, and the white pattern light 502 may both be observed. The surface of the vehicle lamp 500, having the color of the color layer 542, may include the white pattern light 502.

Although the embodiments of the present disclosure have been described with reference to the accompanying drawings, those skilled in the art will understand that the present disclosure can be embodied in other specific forms without departing from the spirit or essential characteristics thereof. Therefore, the described embodiments should be considered in all respects as illustrative rather than restrictive.

What is claimed is:

1. A vehicle lamp comprising:

a light source that emits light;

a lens disposed in a light emission path of the light source; and a main film attached to the lens, wherein the main film includes:

a color layer that reflects ambient light in a predetermined color; and a functional layer that selectively transmits the light emitted from the light source, and wherein the functional layer selectively transmits the light from the light source therethrough using a piezoelectric method.

2. The vehicle lamp of claim 1, wherein the lens is disposed between the light source and the main film.

3. The vehicle lamp of claim 1, further comprising:

a color conversion layer that converts the light emitted from the light source into a predetermined color, wherein color of the light that has passed through the color conversion layer and the color layer is substantially white.

4. The vehicle lamp of claim 3, wherein the functional layer is disposed between the color layer and the color conversion layer.

5. The vehicle lamp of claim 1, wherein the main film further includes a pattern layer that transmits the light from the light source in a predetermined pattern, and wherein the pattern layer is disposed between the light source and the functional layer and includes:

a light-blocking portion that blocks light; and a light-transmitting portion that transmits light in a predetermined pattern.

6. The vehicle lamp of claim 1, wherein the functional layer reflects some of the ambient light and transmits some of the light emitted from the light source.

7. The vehicle lamp of claim 1, wherein the main film further includes a correction layer that corrects color of the light emitted from the light source.

8. A vehicle lamp comprising:

a light source that emits light;

a lens disposed in a light emission path of the light source; and a main film attached to the lens, wherein the main film includes:

a color layer that reflects ambient light in a predetermined color; and a functional layer that selectively transmits the light emitted from the light source, and wherein the functional layer includes:

an ultraviolet (UV) blocking layer that blocks UV light; and a UV activating layer, in which a transmittance for visible light through the UV activating layer is changed in response to ultraviolet light being incident thereto.

9. The vehicle lamp of claim 8, wherein the light source includes:

a first light source that emits visible light; and a second light source that emits ultraviolet light.

10. The vehicle lamp of claim 9, wherein the UV activating layer transmits the visible light from the first light source in response to the UV light from the second light source being incident, and blocks the visible light from the first light source in response to the UV light from the second light source not being incident.

11. The vehicle lamp of claim 8, wherein the UV activating layer is disposed between the UV blocking layer and the light source.

12. The vehicle lamp of claim 8, wherein the lens is disposed between the light source and the main film.

13. The vehicle lamp of claim 8, further comprising:

a color conversion layer that converts the light emitted from the light source into a predetermined color, wherein color of the light that has passed through the color conversion layer and the color layer is substantially white.

14. The vehicle lamp of claim 13, wherein the functional layer is disposed between the color layer and the color conversion layer.

15. The vehicle lamp of claim 8, wherein the main film further includes a pattern layer that transmits the light from the light source in a predetermined pattern, and wherein the pattern layer is disposed between the light source and the functional layer and includes:

a light-blocking portion that blocks light; and a light-transmitting portion that transmits light in a predetermined pattern.

16. The vehicle lamp of claim 8, wherein the functional layer reflects some of the ambient light and transmits some of the light emitted from the light source.

17. A vehicle lamp comprising:

a light source that emits light;

a lens disposed in a light emission path of the light source;

a main film attached to the lens; and an auxiliary film attached to the lens on a side where the main film is not attached, wherein the main film includes a color layer that reflects ambient light in a predetermined color, and wherein the auxiliary film includes:

a guide layer that guides the light from the light source; and a reflective layer that reflects the light guided along the guide layer toward a direction of the main film.

18. The vehicle lamp of claim 17, further comprising:

a color filter disposed between the light source and the guide layer for converting the light emitted from the light source into a predetermined color, wherein color of the light that has passed through the color filter and the color layer is substantially white.

19. The vehicle lamp of claim 17, wherein the lens is disposed between the light source and the main film.

20. The vehicle lamp of claim 17, wherein the main film further includes a pattern layer that transmits the light from the light source in a predetermined pattern, and wherein the pattern layer is disposed between the light source and the functional layer and includes:

a light-blocking portion that blocks light; and a light-transmitting portion that transmits light in a predetermined pattern.

* * * * *